(12) United States Patent
Gao

(10) Patent No.: US 9,199,630 B2
(45) Date of Patent: Dec. 1, 2015

(54) TRANSMISSION CONTROL SYSTEM

(71) Applicant: Shimano Inc., Sakai, Osaka (JP)

(72) Inventor: Jun Gao, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/283,338

(22) Filed: May 21, 2014

(65) Prior Publication Data
US 2015/0088389 A1    Mar. 26, 2015

(30) Foreign Application Priority Data

Sep. 25, 2013   (JP) ................................. 2013-198211

(51) Int. Cl.
| | |
|---|---|
| *B60W 10/04* | (2006.01) |
| *B60W 10/11* | (2012.01) |
| *B62M 6/45* | (2010.01) |
| *B62M 6/55* | (2010.01) |
| *B62M 9/123* | (2010.01) |

(52) U.S. Cl.
CPC ............... *B60W 10/11* (2013.01); *B60W 10/04* (2013.01); *B62M 6/45* (2013.01); *B62M 6/55* (2013.01); *B62M 9/123* (2013.01)

(58) Field of Classification Search
CPC ... Y10T 477/23; Y10T 477/30; Y10T 477/68; Y10T 477/675; B60W 20/00; B60W 10/06; B60W 10/08
USPC ......................... 477/3, 7, 107, 111; 701/53, 54
See application file for complete search history.

(56) References Cited

U.S. PATENT DOCUMENTS

| | | | | |
|---|---|---|---|---|
| 6,629,574 | B2 * | 10/2003 | Turner ........................ | 180/206.4 |
| 8,965,610 | B2 * | 2/2015 | Boyle .............................. | 701/22 |
| 2007/0184925 | A1* | 8/2007 | Ichida et al. .................... | 474/80 |
| 2012/0109436 | A1* | 5/2012 | Saida ............................... | 701/22 |
| 2013/0054065 | A1* | 2/2013 | Komatsu ......................... | 701/22 |
| 2013/0054067 | A1* | 2/2013 | Shoge et al. .................... | 701/22 |
| 2013/0095971 | A1* | 4/2013 | Hino et al. ....................... | 475/5 |
| 2014/0222268 | A1* | 8/2014 | Tsuchizawa .................... | 701/22 |

FOREIGN PATENT DOCUMENTS

JP         08-040342 A      2/1996

* cited by examiner

*Primary Examiner* — Justin Holmes
(74) *Attorney, Agent, or Firm* — Global IP Counselors

(57) ABSTRACT

A transmission control system is provided for used in a bicycle having a crank, a front sprocket that is rotatable independent of the crank, a rear wheel, a rear sprocket that is rotatable independent of the rear wheel, a chain that engages with the front sprocket and the rear sprocket, and at least one external transmission mechanism. The transmission control system is basically provided with a driving force output device, a detection device and at least one controller. The detection device is one of a rotational state detection device, a manual drive force detecting device and a speed detection device. The at least one controller is programmed to control the driving force output device to drive the chain and to control a gear shifting action of the at least one external transmission mechanism to shift gears, based on a comparison of the detection results by the detection device and a prescribed state or a prescribed value.

13 Claims, 8 Drawing Sheets

TRANSMISSION CONTROL SYSTEM

CROSS-REFERENCE TO RELATED APPLICATIONS

This application claims priority under 35 U.S.C. §119 to Japanese Patent Application No. 2013-198211, filed Sep. 25, 2013. The entire disclosure of Japanese Patent Application No. 2013-198211 is hereby incorporated herein by reference.

BACKGROUND

1. Field of the Invention

This invention generally relates to a transmission control system.

2. Background Information

Typically, bicycles have an external transmission mechanism. For example, Japanese Laid-Open Patent Publication No. 1996-040342 discloses an external transmission mechanism for a bicycle. In a bicycle external transmission mechanism, gear shifting can be done by an external transmission mechanism moving the chain to a desired gear location.

SUMMARY

Generally, the present disclosure is directed to various features of a transmission control system having an external transmission mechanism. In order for an external transmission mechanism to move a chain to the desired gear location, the chain needs to be rotating, so that the rider has to rotate the crank when shifting gears. For this reason, there is a problem that the gears cannot be shifted during deceleration.

One aspect of the present invention is to provide a transmission control system that can shift the gears without having to rotate a crank.

The transmission control system according to a first aspect of the present invention is a transmission control system that is used in a bicycle having a crank, a front sprocket, a rear wheel, a rear sprocket, a chain, and at least one external transmission mechanism. The front sprocket is rotatable independent of the crank. The rear sprocket is rotatable independent of the rear wheel. The chain engages with the front sprocket and the rear sprocket. This transmission control system comprises a driving force output device, a rotational state detection device and at least one controller. The driving force output device drives the chain. The rotational state detection device detects the rotational state of the crank. The at least one controller is programmed to control the driving force output device to drive the chain and to control a gear shifting action of the at least one external transmission mechanism to shift gears, based on the rotational state of the crank that is detected by the rotational state detection device, upon determining that the rotational state of the crank is in a prescribed state.

According to this configuration, when the rotational state of the crank becomes a prescribed state, the controller drives the chain to the driving force output device and makes the external transmission mechanism shift gears. For this reason, gear shifting can be done even if the rider does not rotate the crank. Meanwhile, "the front sprocket is rotatable independent of the crank" means that, while the rotation of the crank is transmitted to the front sprocket, the rotation of the front sprocket is not transmitted to the crank. Additionally, "the rear sprocket is rotatable independent of the rear wheel" means that, while the rotation of the rear sprocket is transmitted to the rear wheel, the rotation of the rear wheel is not transmitted to the rear sprocket.

Preferably, the transmission control system further comprises a one-way clutch that is operatively disposed between the driving force output device and the front sprocket. According to this configuration, even when the front sprocket is rotated by the crank, the rotation of the front sprocket will not be transmitted to the driving force output device.

Preferably, the transmission control system further comprises a resultant force member that is configured to transmit the manual drive force that is input to the crank and a driving force that is output from the driving force output device to the front sprocket.

Preferably, the transmission controller further comprises a gear position detection device that is configured to detect the gear position of at least one external transmission mechanism. The at least one controller is programmed to control the gear shifting action of at least one external transmission mechanism to a prescribed gear position.

Preferably, the controller is programmed to control the gear shifting action of the at least one external transmission mechanism be a prescribed gear shifting ratio, based on the gear shifting ratio information that shows a correspondence between the gear position and a gear shifting ratio.

Preferably, the at least one controller is programmed to stop a driving action of the chain by the driving force output device upon determining the gear shifting action of the at least one external transmission mechanism to shifting gears is completed.

Preferably, the transmission control system further comprises a speed detection device that is configured to detect the riding speed of the bicycle. The at least one controller is programmed to control a driving force outputted by the driving force output device so that the driving force will not exceed a reference value that corresponds to the riding speed that is detected by the speed detection device. According to this configuration, even if the driving force output device rotary drives the chain to change gears, the rotation of that chain will not rotary drive the rear wheel. That is, the rear wheel is not rotary driven by the driving force of the driving force output device that is output for shifting gears.

Preferably, the driving force output device comprises an electric motor.

Preferably, the at least one controller is programmed to control the driving force output device so that a rotational speed of the electric motor will not exceed a reference value that corresponds to the riding speed that is detected by the speed detection device. According to this configuration, even if the electric motor rotary drives the chain to change gears, the rotation of the chain will not rotary drive the rear wheel. That is, the rear wheel is not rotary driven by the driving force of the electric motor that is outputted for shifting gears.

Preferably, the at least one controller stops a driving action of the chain by the driving force output device upon determining the riding speed that is detected by the speed detection device becomes less than or equal to a reference value.

The transmission control system according to a second aspect of the present invention is a transmission control system that is used in a bicycle having a crank, a front sprocket, a rear wheel, a rear sprocket, a chain, and at least one external transmission mechanism. The front sprocket is rotatable independent of the crank. The rear sprocket is rotatable independent of the rear wheel. The chain engages with the front sprocket and the rear sprocket. This transmission control system comprises a driving force output device, a manual drive force detecting device and at least one controller. The driving force output device drives the chain. The manual drive force detecting device detects the manual drive force that is input to the crank. The at least one controller is programmed to control the driving force output device to drive the chain and a gear shifting action of the at least one external transmission mechanism to shift gears, based on the manual drive force that is detected by the manual drive force detecting device, upon determining that the manual drive force is less than or equal to a prescribed value According to this configuration, if the manual drive force that is input to the crank becomes less than or equal to a prescribed value, the controller drives the chain to the driving force output device and makes the external transmission mechanism shift gears. For this reason, gear shifting can be done even if the rider does not rotate the crank.

The transmission control system according to a third aspect of the present invention is a transmission control system that is used in a bicycle having a crank, a front sprocket, a rear wheel, a rear sprocket, a chain, and at least one external transmission mechanism. The front sprocket is rotatable independent of the crank. The rear sprocket is rotatable independent of the rear wheel. The chain engages with the front sprocket and the rear sprocket. This transmission control system comprises a driving force output device, a speed detection device and at least one controller. The driving force output device drives the chain. The speed detection device detects the riding speed of the bicycle. The at least one controller is programmed to control the driving force output device to drive the chain and to control a gear shifting action of the at least one external transmission mechanism to shift gears, based on the riding speed that is detected by the speed detection device, upon determining that the riding speed is less than or equal to a first prescribed value.

According to this configuration, when the riding speed of the bicycle becomes less than or equal to a first prescribed value, the controller drives the chain to the driving force output device and makes the external transmission mechanism shift gears. For this reason, gear shifting can be done even if the rider does not rotate the crank.

Preferably, the at least one controller is programmed to stop the driving action of the chain by the driving force output device upon determining the riding speed that is detected by the speed detection device becomes less than or equal to a second prescribed value that is smaller than the first prescribed value.

According to the present invention, a transmission control system that can shift gears without rotating the crank can be provided.

Also other objects, features, aspects and advantages of the disclosed transmission control system will become apparent to those skilled in the art from the following detailed description, which, taken in conjunction with the annexed drawings, discloses several illustrative embodiments of the transmission control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
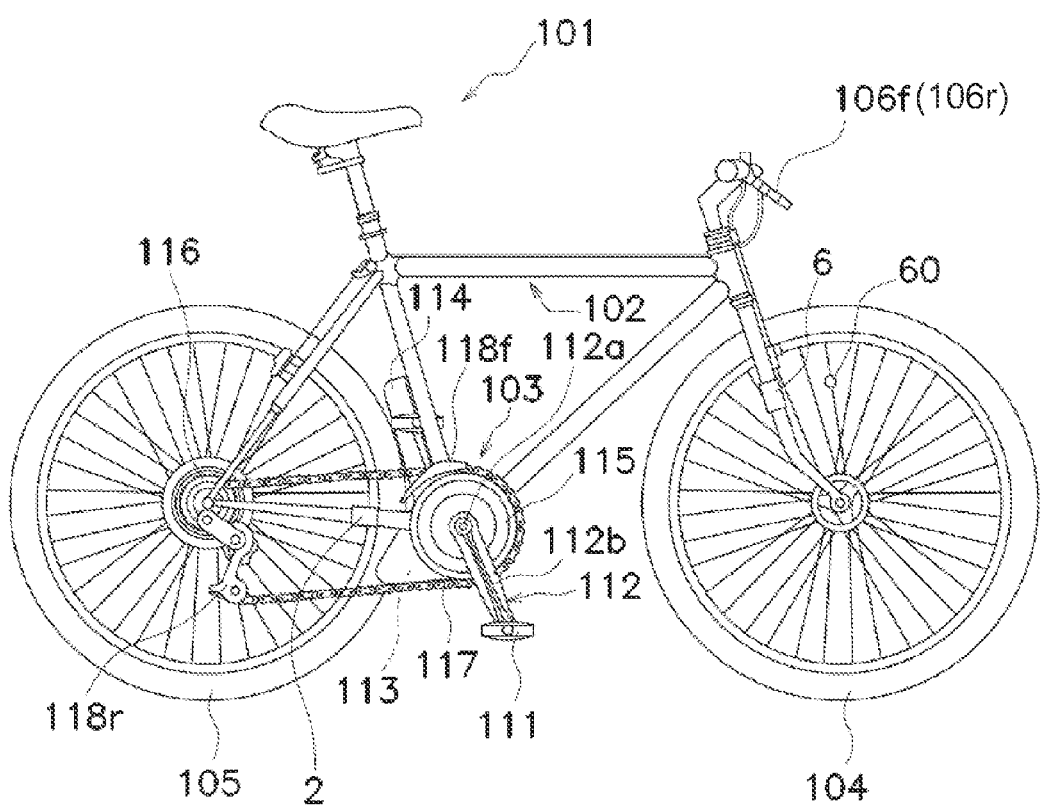
FIG. 1 is a side elevational view of a bicycle that is equipped with a transmission control system in accordance with the illustrated embodiments.

Referring initially to FIG. 1, a bicycle 101 is illustrated that is equipped with a transmission control system in accordance with a first embodiment. FIG. 1 is a side elevational view of the bicycle 101 on which the transmission control system is disposed. As shown in FIG. 1, a bicycle 101 on which the transmission control system according to the first embodiment is disposed comprises a frame 102, a driving unit 103 (i.e., a bicycle drive train), a front wheel 104, a rear wheel 105, a first gear shift operation member 106$f$ and a second gear shift operation member 106$r$. When operated by a rider, the first gear shift operation member 106$f$ sends a gear shifting signal to a front derailleur 118$f$ to move the front derailleur 118$f$ to shift gears of the driving unit 103. Additionally, when operated by a rider, the second gear shift operation member 106$r$ sends a gear shifting signal to a rear derailleur 118$r$ to move the rear derailleur 118$r$ to shift gears of the driving unit 103.

The drive unit 103 comprises a pair of pedals 111 attached to a crank 112. The drive unit 103 also comprises an assist mechanism 113 and a rechargeable battery 114. The assist mechanism 113 is detachably supported on the frame 102. The rechargeable battery 114 is detachably supported on the frame 102 and serves as a power supply for the assist mechanism 113. Additionally, the driving unit 103 further comprises a front sprocket group 115, a rear sprocket group 116 and a chain 117. The front derailleur 118$f$ and the rear derailleur 118$r$ are examples of an external transmission mechanism for shifting gears of the drive unit 103.

The crank 112 includes a crank axle 112$a$ and a pair of crank arms 112$b$. Each of the crank arms 112$b$ is installed on one of the ends of the crank axle 112$a$. The assist mechanism 113 comprises a motor 120 and a motor driver 120$a$ as discussed below. The rechargeable battery 114 is a storage battery that uses, for example, a nickel hydride cell or a lithium ion cell. The rechargeable battery 114 is detachably mounted to the frame 102.

The front sprocket group 115 is rotatable independent of the crank 112. In particular, while the rotation of the crank 112 is transmitted to the front sprocket group 115, the rotation of the front sprocket group 115 is not transmitted to the crank 112. In this way, the front sprocket group 115 can freely rotate while the crank 112 remains stationary. Specifically, the front sprocket group 115 is connected to the crank 112 via a second one-way clutch 161, as mentioned below. In particular, as mentioned above, while the rotation of the crank 112 is transmitted to the front sprocket group 115, the rotation of the front sprocket group 115 is not transmitted to the crank 112.

The rear sprocket group 116 is rotatable independent of the rear wheel 105. In particular, the rear sprocket group 116 is connected to the rear wheel 105 via a one-way clutch. In this way, the rear wheel 105 can freely rotate while the rear sprocket group 116 remains stationary or rotations slower than the rear wheel 105. For this reason, the rotation of the rear sprocket group 116 is transmitted to the rear wheel 105, but the rotation of the rear wheel 105 is not transmitted to the rear sprocket group 116. Accordingly, if the rotational speed of the rear wheel 105 is greater than the rotational speed of the rear sprocket group 116, the rotation of the rear sprocket group 116 will not be transmitted to the rear wheel 105.

The chain 117 is engaged with one of the sprockets in the front sprocket group 115 and engaged with one of the sprockets in the rear sprocket group 116. In this way, rotation of the front sprocket group 115 is transmitted to the rear sprocket group 116.

Figure 2:
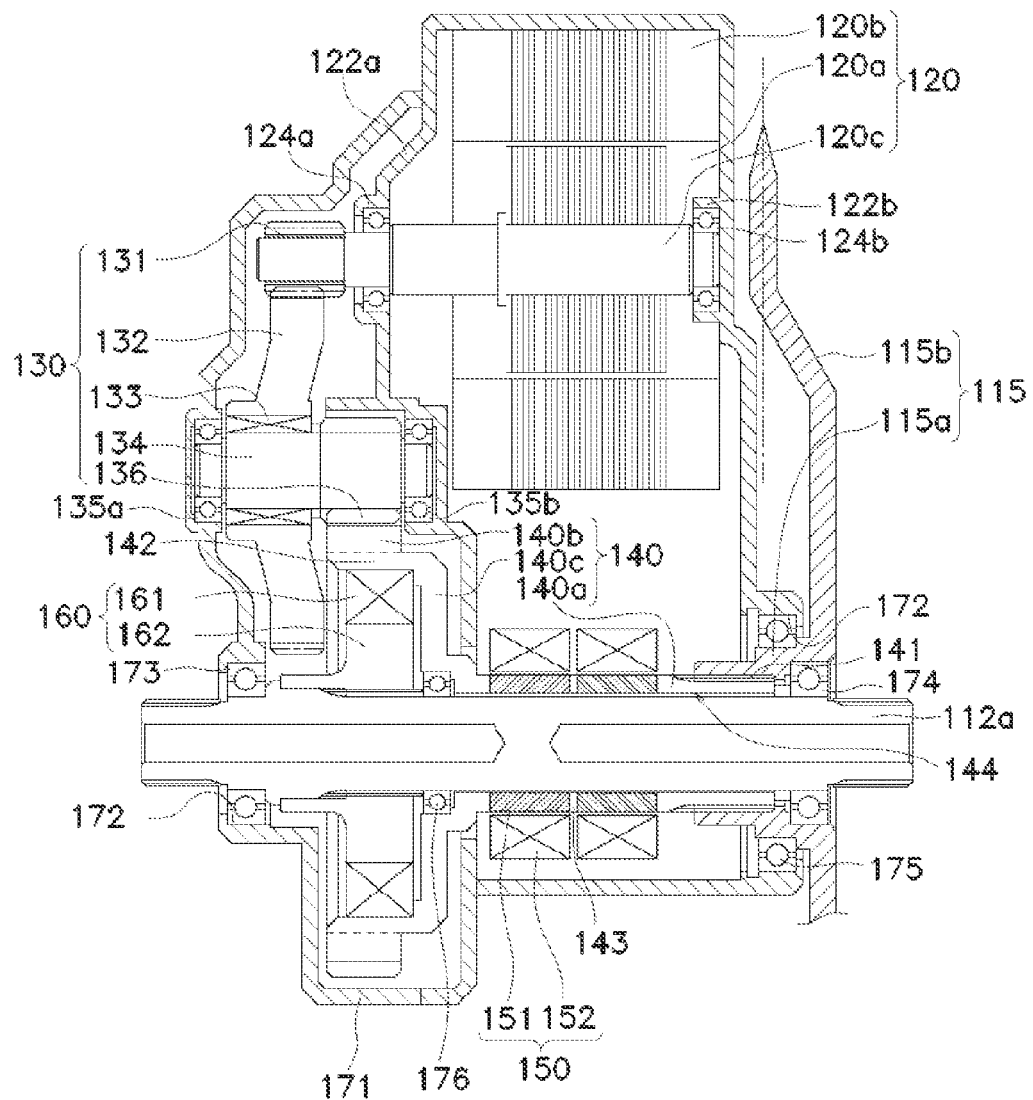
FIG. 2 is a cross-sectional view of the driving unit of the bicycle illustrated in FIG. 1 that is used with the transmission control system.

FIG. 2 is a cross-sectional view of one part of the driving unit 103. Meanwhile, in FIG. 2, the front sprocket group 115 shows only one front sprocket. As shown in FIG. 2, the driving unit 103 is configured by comprising a motor 120, a first connecting part 130, a second connecting part 160, a driving force transmitting part 140 and a torque sensor 150. The motor 120 is one example of a driving force output device.

The driving unit 103 includes a casing 171 that houses the motor 120, the first connecting part 130, the second connecting part 160, the driving force transmitting part 140 and the torque sensor 150. The crank axle 112a is inserted in a through-hole 172 of the casing 171. The two axial end portions of the crank axle 112a each protrude from the casing 171. The end portion of the crank axle 112a that is on the opposite side of the front sprocket 115 is rotatably supported by a casing 171 via a first axle bearing 173. The end portion of the crank axle 112a on the side with the front sprocket 115 is rotatably supported by the casing 171 via a second axle bearing 174. Disposed between the casing 171 and the second axle bearing 174 is a third axle bearing 175 and the front sprocket 115. Thus, the front sprocket 115 is rotatably supported by the third axle bearing 175 for independent rotation with respect to the crank axle 112a.

The motor 120 includes a rotor 120a, a stator 120b and a rotational axle 120c. The rotor 120a is fixedly mounted to the rotational axle 120c. The motor 120 is disposed so that the rotational axle 120c is parallel with the crank axle 112a. The rotational axle 120c of the motor 120 is rotatably supported by a fourth axle bearing 124a and a fifth axle bearing 124b. The fourth axle bearing 124a and the fifth axle bearing 124b are axially spaced apart on the rotational axle 120c with a space in between them for the rotor 120a. The rotational axle 120c is fixed to the rotor 120a of the motor 120. The stator 120b of the motor 120 is installed around an outer periphery of the rotor 120a. The stator 120b is fixed to the casing 171, which is fixed to the frame 102. The fourth axle bearing 124a is supported by an attachment portion 122a that is installed on the casing 171. The fifth axle bearing 124b is supported by an attachment portion 122b that is installed on the casing 171. The fourth axle bearing 124a and the fifth axle bearing 124b are, for example, radial industrial ball bearings.

The output of the motor 120 is transmitted to the driving force transmitting part 140 via the first connection unit 130. In the illustrated embodiments, the first connection unit 130 comprises a first gear 131, a second gear 132, a first one-way clutch 133, a rotational axle 134, and a third gear 136. Thus, the illustrated embodiments, the output of the motor 120 is transmitted to the driving force transmitting part 140 via the first gear 131→the second gear 132→the first one-way clutch 133, the rotational axle 134→the third gear 136. The rotational axis of the rotational axle 134, the rotational axis of the crank axle 112a and the rotational axle 120c of the motor 120 are disposed parallel to each other. The rotational axis of the rotational axle 134 is installed in a location that is spaced from the rotational axes of the rotational axle 120c and the crank axle 112a. With this, the crank axle 112a and the rotational axle 120c of the motor 120 can be disposed as near to each other as possible, so that the driving unit 103 can be made small.

The first gear 131 is rigidly fixed to the rotational axle 121. With this, the first gear 131 rotates integrally with the rotational axle 120c. The second gear 132 engages with the first gear 131. The second gear 132 is rotatably supported in one direction around the rotational axle 134 via the first one-way clutch 133. The first one-way clutch 133 is, for example, a one-way clutch that comprises a pawl and a ratchet. The first one-way clutch 133 is installed so that the rotation of the second gear 132 is transmitted to the rotational axle 134 but the rotation of the rotational axle 134 is not transmitted to the second gear 132.

The rotational axle 134 is rotatably supported by a sixth axle bearing 135a and a seventh axle bearing 135b. The sixth axle bearing 135a and the seventh axle bearing 135b are axially spaced apart on the rotational axle 134 with a space in between them. The sixth axle bearing 135a and the seventh axle bearing 135b are supported by the casing 171. The sixth axle bearing 135a and the seventh axle bearing 135b are, for example, radial industrial ball bearings.

The third gear 136 is rigidly fixed to the rotational axle 134. With this, the third gear 136 rotates integrally with the rotational axle 134. The third gear 136 can be integrally formed with the rotational axle 134 as a one-piece member. The third gear 136 engages with the driving force transmitting part 140 as mentioned below.

Here, the number of teeth of the second gear 132 is greater than the number of teeth of the first gear 131, and the number of teeth of the driving force transmitting part 140 is greater than the number of teeth of the third gear 136. Additionally, the number of teeth of the second gear 132 is greater than the number of teeth of the third gear 136. With the first gear 131 and the second gear 132 engaging with each other and the third gear 136 and the driving force transmitting part 140 engaging with each other, a double speed reduction is attained. In this way, the first connecting part 130 is one example of a deceleration mechanism or a rotational speed reduction mechanism.

The pedaling force of the rider is transmitted to the driving force transmitting part 140 via the second connecting part 160. The second connecting part 160 comprises a second one-way clutch 161 and a one-way clutch attachment member 162. Thus, the pedaling force of the rider is transmitted to the driving force transmitting part 140 via the pedals 111→the crank arms 112b→the crank axle 112a→the second one-way clutch 161. The one-way clutch attachment member 162 is rigidly fixed with the crank axle 112a. With this arrangement, the one-way clutch attachment member 162 rotates integrally with the crank axle 112a. The second one-way clutch 161 is installed on an outer peripheral part of the one-way clutch attachment member 162. The second one-way clutch 161 is, for example, by a one-way clutch that comprises a pawl and a ratchet. The second one-way clutch 161 is installed so that the rotation of the crank axle 112a is transmitted to a coupling portion 142 but the rotation of the coupling portion 142 is not transmitted to the crank axle 112a.

The driving force transmitting part 140 transmits the torque that combines the output of the motor 120 and the torque of the crank axle 112*a* to the front sprocket 115. The driving force transmitting part 140 is one example of a resultant force member or a combined force member. The driving force transmitting part 140 comprises a sprocket connecting portion 141, a coupling portion 142 and a sensor locating part 143. Preferably, the driving force transmitting part 140 further comprises an insertion hole 144 to insert the crank axle 112*a*. Here, the driving force transmitting part 140 is formed in a tube shape. The driving force transmitting part 140 comprises a first tubular portion 140*a*, a second tubular portion 140*b* and a connecting portion 140*c*. The first tubular portion 140*a* includes the sprocket connecting portion 141 and the sensor locating part 143. The second tubular portion 140*b* forms the coupling portion 142. The connecting portion 140*c* connects the first tubular portion 140*a* and the second tubular portion 140*b*. The first tubular portion 140*a*, the second tubular portion 140*b* and the connecting portion 140*c* are integrally formed as a one-piece, unitary member.

The sprocket connecting portion 141 couples with the front sprocket 115. The sprocket connecting portion 141 firmly fixes the front sprocket 115 to the driving force transmitting part 140 with, for example, a serration or a spline. The front sprocket 115 can also be inserted in the sprocket connecting portion 141. The end portion of the sprocket connecting portion 141 of the driving force transmitting part 140 is rotatably supported by the casing 171 via the front sprocket 115 and the third axle bearing 175. The front sprocket 115 comprises a base 115*a* and a sprocket main body 115*b*. The base 115*a* is connected to the sprocket connecting portion 141. The base 115*a* is formed in a tube-shape. The sprocket connecting portion 141 is connected to an inner peripheral part of the base 115*a*. Additionally, the second axle bearing 174 is supported by the inner peripheral portion of the base 115*a*, and the outer peripheral portion is supported by the third axle bearing 175. The base 115*a* protrudes outward from the casing 171 via the through-hole 172.

The sprocket main body 115*b* has a plurality of gear teeth on its outer peripheral portion. The sprocket main body 115*b* extends radially from the end portion of the base 115*a* that protrudes to the outside from the casing 171. The base 115*a* and the sprocket main body 115*b* can be integrally formed or they can be formed separately.

The coupling portion 142 couples the first connecting part 130 and the second connecting part 160. In other words, the coupling portion 142 has gears that engage with the third gear 136, and is connected to the second one-way clutch 161. The coupling portion 142 is disposed at a distance from the sprocket connecting portion 141 in a rotational axis of the crank axle 112*a*, so that the torque sensor 150 can easily detect a torque that is generated in the driving force transmitting part 140.

The second tubular portion 140*b* that forms the coupling portion 142 is formed in a tube shape with an outer diameter that is larger than the first tubular portion 140*a*. The connecting portion 140*c* extends radially outward from the end portion of the first tubular portion 140*a* that is on the opposite side of the sprocket connecting portion 141. The outer peripheral portion of the connecting portion 140*c* in the radial direction is connected to the second tubular portion 140*b*. The second tubular portion 140*b* extends to the opposite side of the sprocket connecting portion 141 from the connecting portion 140*c*.

The third gear 136 is connected to the outer peripheral portion of the coupling portion 142. The second one-way clutch 161 is connected to the inner peripheral portion of the coupling portion 142. The third gear 136 and the second one-way clutch 161 are installed so that they at least partially overlap in a direction that is perpendicular to the crank axle 112*a*.

The end portion of the first tubular portion 140*a* that is on the opposite side of the sprocket connecting portion 141 is rotatably supported by the crank axle 112*a* via an eighth axle bearing 176. The eighth axle bearing 176 is disposed between the connecting portion 140*c* and the crank axle 112*a*. The eighth axle bearing 176 is, for example, a radial industrial ball bearing.

At least one part of the torque sensor 150 is installed on the sensor locating part 143. The torque sensor 150 is preferably, for example, a magnetostrictive sensor that comprises a magnetostrictive element 151 and a detection coil 152. The sensor locating part 143 is disposed between the sprocket connecting portion 141 and the coupling portion 142. Preferably, the sensor locating part 143 is disposed on the outer perimeter part of the first tubular portion 140*a*. For example, a magnetostrictive element 151 that is a part of a magnetostrictive sensor is installed in the sensor locating part 143. In the case that a magnetostrictive element 151 is installed in the sensor locating part 143, and the detection coil 152 is installed on the outer perimeter side of the first tubular portion 140*a* to detect torsion of the magnetostrictive element 151. In this case, the torque sensor 150 (a magnetostrictive sensor) that detects the torsion of the first tubular portion 140*a* is formed by the magnetostrictive element 151 and the coil 152. The detection coil 152 is installed in a coil retaining member (not diagrammed) that retains this detection coil 152. The coil retaining member is fixed on the casing 171. The torsion of the first tubular portion 140*a* corresponds to the torque that is generated on the first tubular portion 140*a*.

Figure 3:
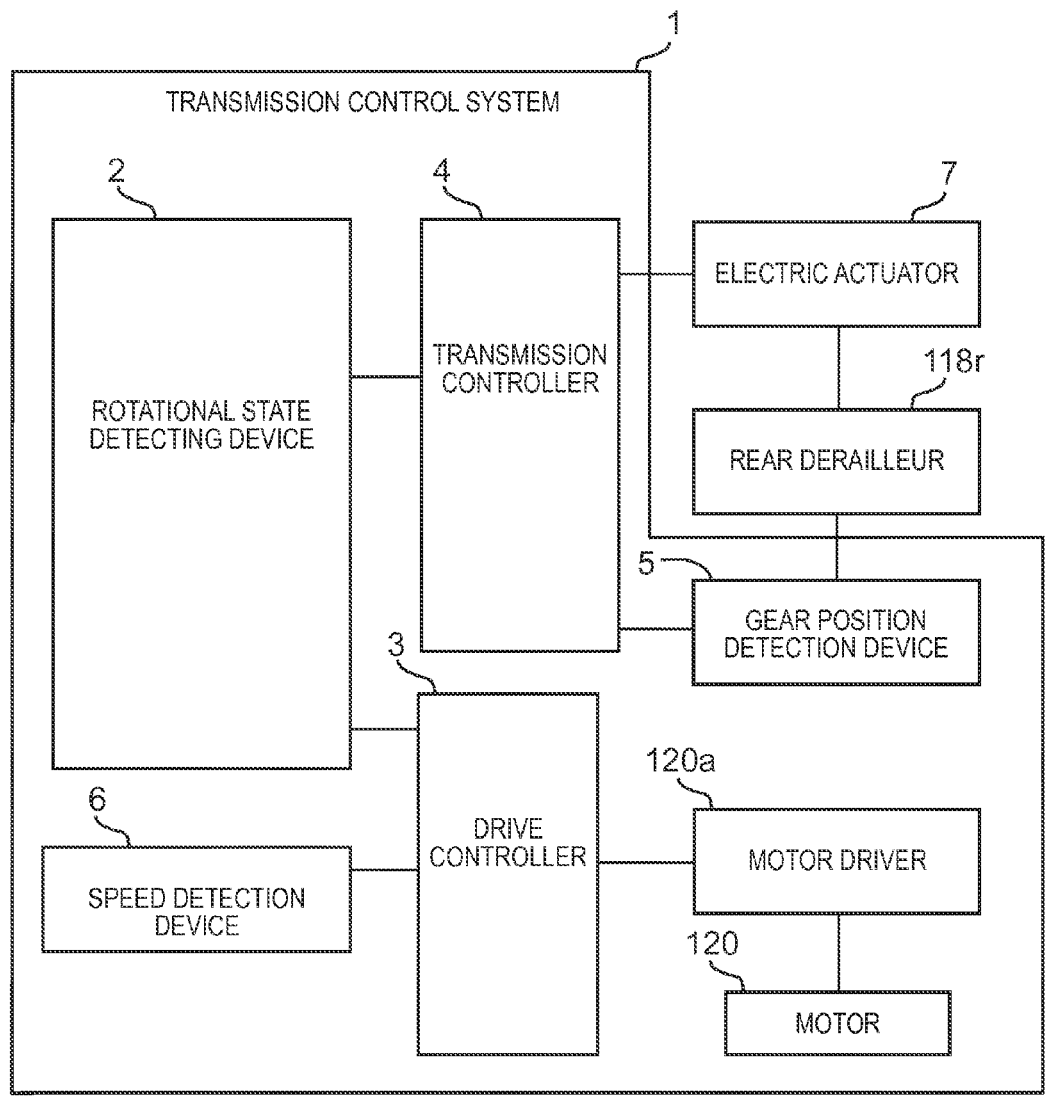
FIG. 3 is a block diagram of a transmission control system in accordance with the first embodiment.

FIG. 3 is a block diagram of a transmission control system 1 of a first embodiment. As shown in FIG. 3, the transmission control system 1 comprises the motor 120 as discussed above, a rotational state detection device 2, a drive controller 3, and a transmission controller 4. Additionally, the transmission control system 1 comprises a motor driver 120*a*, a gear position detection device 5 and a speed detection device 6.

The motor 120 drives the chain 117. In particular, as mentioned above, the output of the motor 120 is transmitted to the front sprocket 115 via various members, and as a result, the front sprocket 115 rotates, and the chain 117 is driven.

The rotational state detection device 2 detects a rotational state of the crank 112. Specifically, the rotational state detection device 2 is a cadence sensor that detects the cadence of the crank 112 as the rotational state. The rotational state detection device 2 is, for example, attached to the frame 102. The rotational state detection device 2 is a sensor that detects a magnet that is attached to the crank arm 112*b*. The rotational state detection device 2 outputs the detected information regarding the rotational state of the crank 112 to the drive controller 3 and the transmission controller 4.

The gear position detection device 5 detects the gear position of the rear derailleur 118*r*. For example, the gear position detection device 5 is a gear position sensor that detects which rear sprocket of the rear sprocket group 116 is engaged by the chain 117 due to the position of the chain cage of the rear derailleur 118*r*.

The speed detection device 6 detects the riding speed of the bicycle 101. In more detail, the speed detection device 6 is a speed sensor. For example, the speed detection device 6 is attached to the front fork of the bicycle 101. The speed detection device 6 is a sensor that detects a magnet 60 that is attached to one of the spokes of the front wheel 104 (refer to FIG. 1). The speed detection device 6 outputs information regarding the riding speed of the bicycle 101 that is detected by the speed detection device 6 to the drive controller 3.

The drive controller 3 is programmed to operate the motor 120 to drive the chain 117 based on the detection results of the rotational state detection device 2 when a determination is made that the rotational state of the crank 112 is in a prescribed state. Specifically, the drive controller 3, based on the cadence of the crank 112 that is detected by the rotational state detection device 2, determines whether or not the rotational state of the crank 112 is in a prescribed state. For example, the drive controller 3 is programmed to determine whether or not the cadence of the crank 112 is less than or equal to a prescribed value that is preset beforehand. Additionally, if a determination is made that the cadence is less than or equal to the prescribed value, the drive controller 3 is programmed to control the motor driver 120a to operate the motor 120, and thus, drive the chain 117.

As mentioned above, if the rotational state of the crank 112 is in a prescribed state, the drive controller 3 controls the motor 120 so that the driving force that is output by the motor 120 will not exceed a reference value that corresponds to the riding speed that is detected by the speed detection device 6. This "reference value that corresponds to the riding speed" refers to the driving force of the motor 120 that is necessary to achieve this riding speed. If the motor 120 outputs a driving force that exceeds this reference value, the rear wheel 105 is driven by the motor 120 via the chain 117, the rear sprocket group 116, etc. For this reason, with the drive controller 3 controlling the motor 120 so that the driving force that is output by the motor 120 does not exceed the above-described reference value, the motor 120 drives only the chain 117 and will not drive the rear wheel 105. Meanwhile, this reference value can change depending on the gear ratio, etc., and the drive controller 3 stores information regarding the reference value that is correlated with the gear ratio and the riding speed. Meanwhile, the drive controller 3 comprises, for example, a central processing unit (CPU) and a memory that stores a prescribed program.

The transmission controller 4 is programmed to operate the rear derailleur 118r to shift gears (i.e., moves the chain 117 between rear sprockets of the rear sprocket group 116) based on the detection results of the rotational state detection device 2 when a determination is made that the rotational state of the crank 112 is in a prescribed state. Specifically, the transmission controller 4, based on the cadence of the crank 112 that is detected by the rotational state detection device 2, determines whether or not the rotational state of the crank 112 is in a prescribed state. For example, the transmission controller 4 determines whether or not the cadence of the crank 112 is less than or equal to a prescribed value that is preset beforehand.

If the transmission controller 4 determines that the cadence of the crank 112 is less than or equal to a prescribed value that is preset beforehand, the rear derailleur 118r is operated to shift gears. In more detail, the transmission controller 4 controls an electric actuator 7. The electric actuator 7 operates the rear derailleur 118r to shift gears (i.e., moves the chain 117 between rear sprockets of the rear sprocket group 116). Thus, the transmission controller 4 controls the gear shifting action of the rear derailleur 118r to be a prescribed gear position. Here, the transmission controller 4 controls the gear shifting action of the rear derailleur 118r, based on gear shifting ratio information that shows a correspondence between the gear position and the gear shifting ratio. Meanwhile, the transmission controller 4 comprises, for example, a central processing unit (CPU) and memory that stores a prescribed shifting program.

Figure 4:
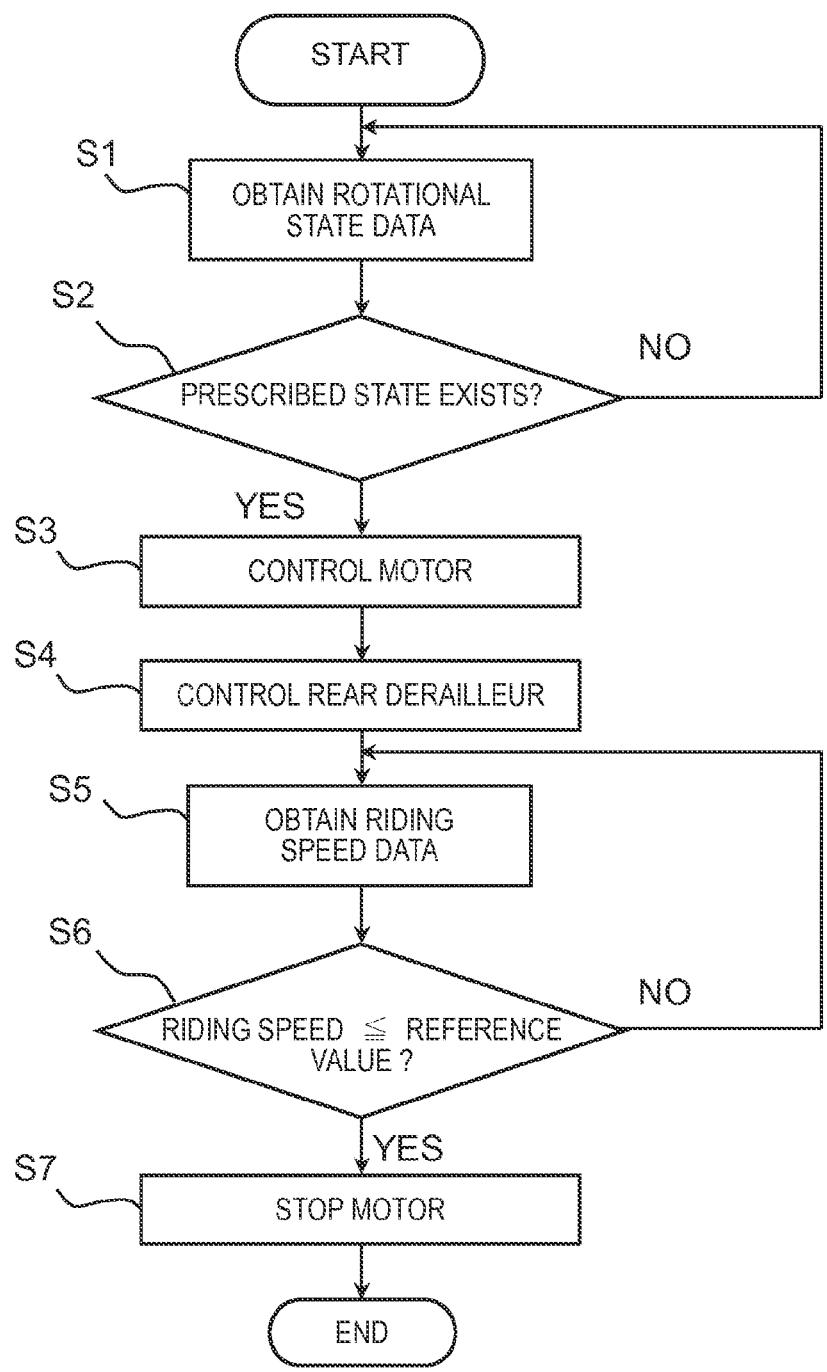
FIG. 4 is a flow chart showing a process executed by the transmission control system in accordance with the first embodiment.

Next, the process of the transmission control system 1 will be explained with reference to FIG. 4. FIG. 4 is a flow chart showing a process executed by the transmission control system.

As shown in FIG. 4, the drive controller 3 and the transmission controller 4 obtain the detection results of the rotational state detection device 2, that is, information (crank rotational state data) regarding the rotational state detected by the rotational state detection device 2 (step S1). Specifically, the drive controller 3 and the transmission controller 4 obtain information (crank rotational state data) regarding the cadence of the crank 112 that is detected by the rotational state detection device 2.

Next, the drive controller 3 and the transmission controller 4 determine whether or not the rotational state of the crank 112 is in the prescribed state, based on the obtained information regarding the rotational state (step S2). Specifically, the drive controller 3 and the transmission controller 4 determine whether or not the cadence of the crank 112 is less than or equal to the prescribed value that is preset beforehand. Here, the prescribed value that is preset beforehand is, for example, 10 rpm.

If at least the drive controller 3 or the transmission controller 4 determines that the rotational state of the crank 112 is not in the prescribed state (No in step S2), the process moves on to step S1. Meanwhile, if the drive controller 3 and the transmission controller 4 determine that the rotational state of the crank 112 is in the prescribed state, that is, that the cadence of the crank 112 is less than or equal to the prescribed value (Yes in step S2), the drive controller 3 operates the motor 120 to drive the chain 117 (step S3). When a rider begins to pedal the bicycle, that is, until the rotational state of the crank 112 of a stopped bicycle exceeds a prescribed value, in the process of step S2, this state of the crank 112 can be considered as being in the prescribed state and the process proceeds from step S2 to step S3.

Additionally, the transmission controller 4 controls the rear derailleur 118r to shift gears (step S4). In more detail, the transmission controller 4 controls the electric actuator 7 and makes the rear derailleur 118r shift gears to be a prescribed gear position.

Next, the drive controller 3 obtains information regarding the riding speed that is detected by the speed detection device 6 (step S5).

The drive controller 3, based on information (riding speed data) regarding the current riding speed, determines whether or not the riding speed is less than or equal to a reference value that is preset beforehand (step S6). When a determination is made that the riding speed is less than or equal to the reference value (Yes in step S6), the drive controller 3 stops the motor 120 (step S7). That is, the drive controller 3, by stopping the motor 120, stops the driving action of the chain 117 by the motor 120. When a determination is made that the riding speed is not less than or equal to the reference value (No in step S6), the drive controller 3 proceeds to the process of step S5. Meanwhile, the reference value mentioned above can be, for example, 1 km/h (in a state immediately before stopping) or 0 km/h (in a stopped state).

Second Embodiment

Next, the transmission control system 1a according to a second embodiment will be explained. Since the bicycle 101 to which the transmission control system 1a according to the second embodiment is applied is the same as the bicycle 101 explained in the above-described first embodiment, this explanation will not be repeated.

Figure 5:
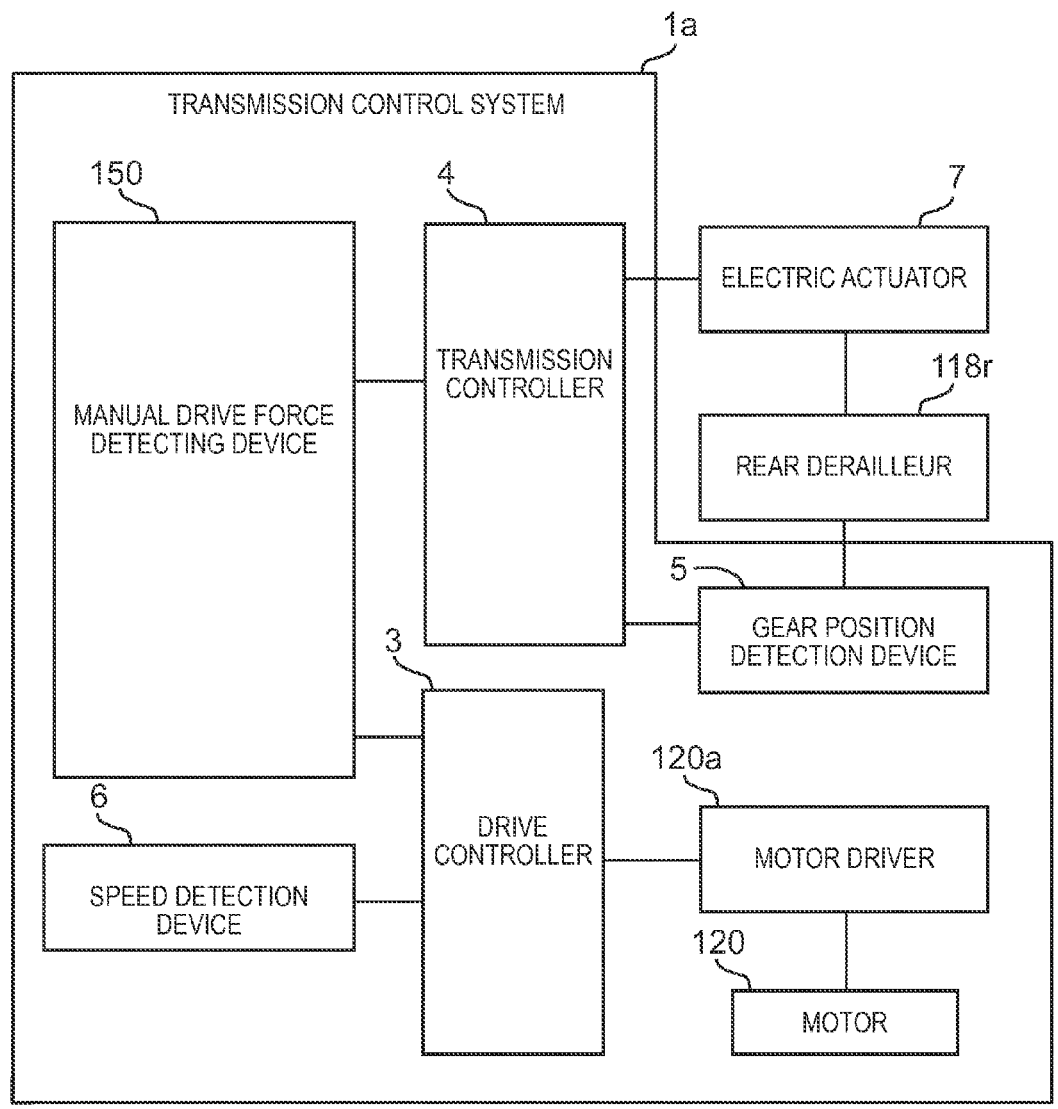
FIG. 5 is a block diagram of a transmission control system in accordance with the second embodiment.

FIG. 5 is a block diagram of a transmission control system 1*a* according to the second embodiment. As shown in FIG. 5, the transmission control system 1*a*, unlike the transmission control system 1 according to the first embodiment, comprises the torque sensor 150, mentioned above, as a manual drive force detecting device instead of a rotational state detection device 2. Since the other configurations of the transmission control system 1*a* according to the second embodiment are the same configurations as the transmission control system 1 according to the first embodiment, they will not be described again in detail.

The manual drive force detecting device 150 detects the manual drive force that is input to the crank 112. For example, the manual drive force detecting device can be the torque sensor 150 mentioned above. That is, the manual drive force detecting device 150 is a torque sensor that detects the torque acting on the crank axle 112*a* as the manual drive force. The manual drive force detecting device 150 outputs the detected information regarding the manual drive force to the drive controller 3 and the transmission controller 4.

The drive controller 3 operates the motor 120 to drive the chain 117, based on the manual drive force detected by the manual drive force detecting device 150 when a determination has been made that the manual drive force is less than or equal to a prescribed value. Specifically, the drive controller 3 determines whether or not the torque that is detected by the manual drive force detecting device 150 is less than or equal to a prescribed value that is preset beforehand. Additionally, if a determination is made that the torque is less than or equal to the prescribed value, the drive controller 3 controls the motor driver 120*a* to operate the motor 120 and thus drives the chain 117. Regarding the other features of the drive controller 3, since they are the same as the drive controller 3 according to the first embodiment, they will not be described again in detail. Meanwhile, the above-described prescribed value is, for example, 5 N·m.

The transmission controller 4, like the above-described drive controller 3, determines whether or not the manual drive force is less than or equal to a prescribed value, based on the manual drive force that is detected by the manual drive force detecting device 150. If the transmission controller 4 determines that the manual drive force is less than or equal to the prescribed value, the transmission controller 4 controls the rear derailleur 118*r* to shift the gears. Meanwhile, regarding the other features of the transmission controller 4, since they are the same as the transmission controller 4 according to the first embodiment, they will not be described again in detail.

Figure 6:
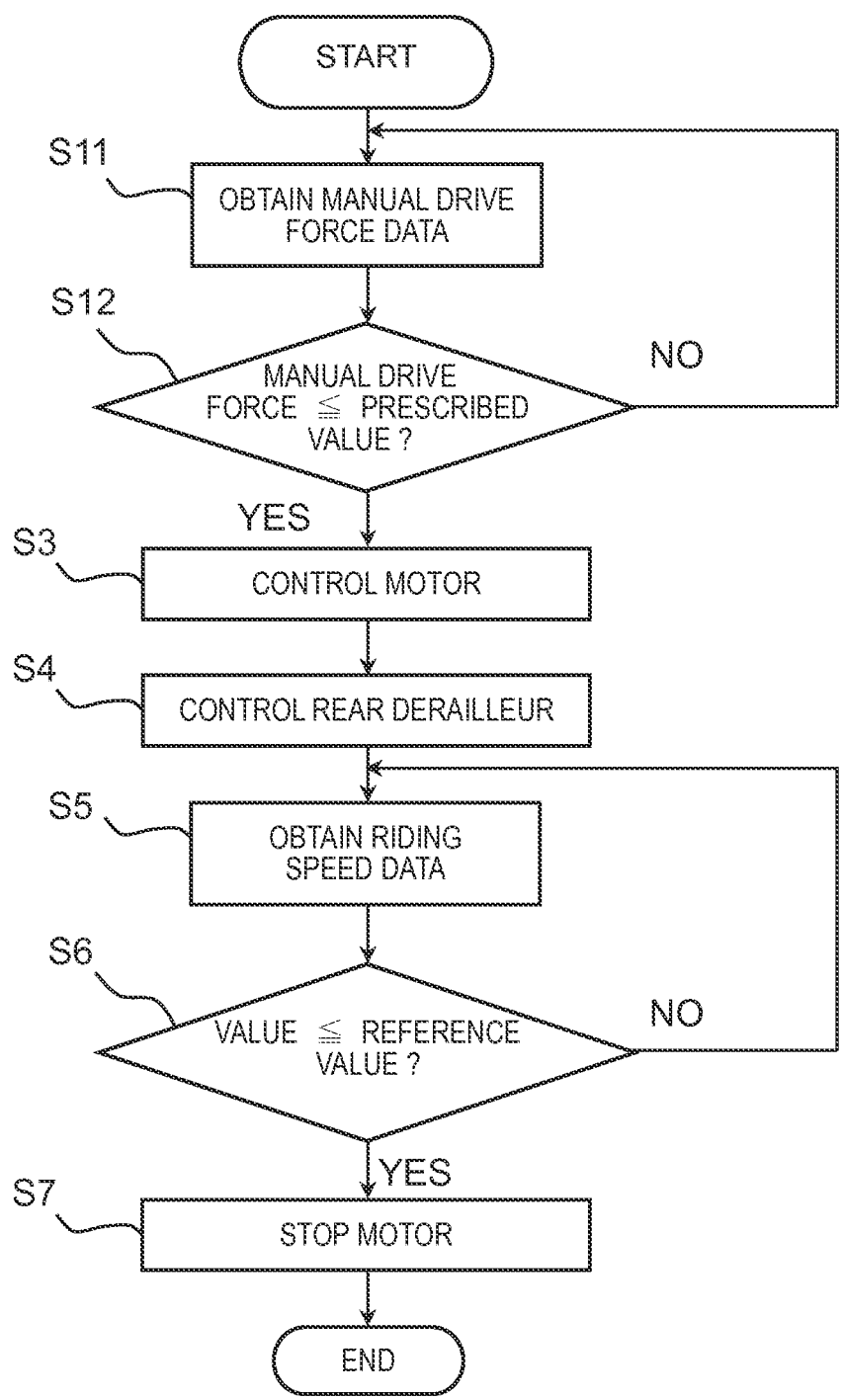
FIG. 6 is a flow chart showing a process executed by the transmission control system in accordance with the second embodiment.

Next, the process of the transmission control system 1*a* according to the second embodiment will be explained with reference to FIG. 6. FIG. 6 is a flow chart that shows the process executed by the transmission control system 1*a* according to the second embodiment. Since the processes of steps S3-S7 in FIG. 6 are the same as the first embodiment, they will not be explained again in detail.

As shown in FIG. 6, the drive controller 3 and the transmission controller 4 obtain information (manual drive force data) regarding the manual drive force that is detected by the manual drive force detecting device 150 (step S11). Specifically, the drive controller 3 and the transmission controller 4 obtain information regarding the torque that is acting on the crank axle 112*a*.

Next, the drive controller 3 and the transmission controller 4, based on the information regarding the obtained manual drive force, determine whether or not the manual drive force that is detected by the manual drive force detecting device 150 is less than or equal to a prescribed value (step S12). Specifically, the drive controller 3 and the transmission controller 4 determine whether or not the torque that is acting on the crank axle 112*a* is less than or equal to a prescribed value that is preset beforehand. The drive controller 3 and the transmission controller 4 can determine whether or not the manual drive force, in the process of step S12, is less than or equal to the prescribed value for a prescribed period of time (for example, 5 seconds).

If at least the drive controller 3 or the transmission controller 4 determines that the manual drive force is not less than or equal to the prescribed value (No in step S12), the process moves on to step S11 mentioned above. If the drive controller 3 and the transmission controller 4 determine that the manual drive force is less than or equal to the prescribed value (Yes in step S12), the drive controller 3 operates the motor 120 to drive the chain 117 (step S3). Additionally, the transmission controller 4 controls the rear derailleur 118*r* to shift gears (step S4).

Third Embodiment

Next, the transmission control system 1*b* according to the third embodiment will be explained. Since the bicycle 101 on which the transmission control system 1*b* according to the third embodiment is disposed is the same as the bicycle 101 explained in the above-described first embodiment, the explanation will not be repeated here.

Figure 7:
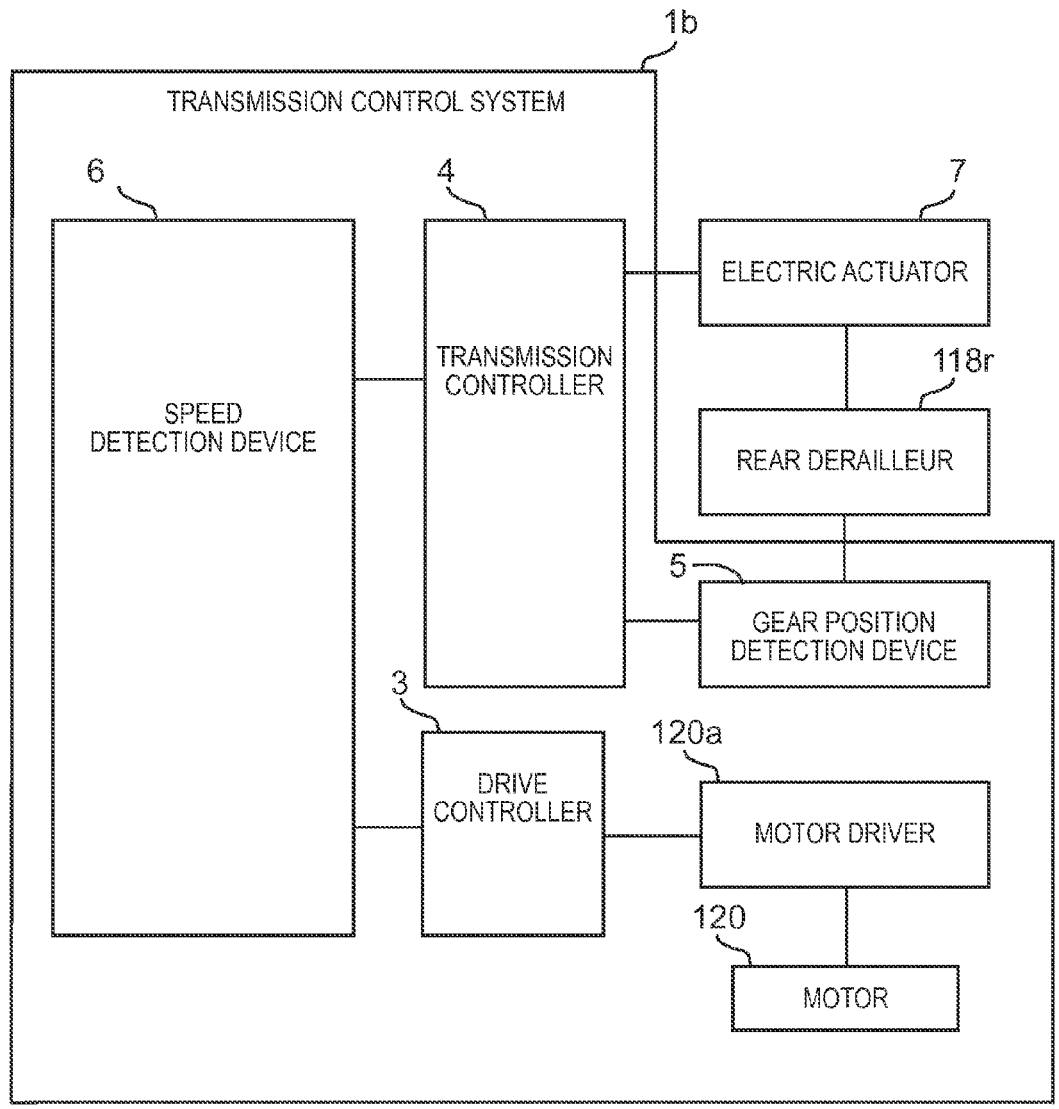
FIG. 7 is a block diagram of a transmission control system in accordance with the third embodiment.

FIG. 7 is a block diagram of a transmission control system 1*b* according to the third embodiment. As shown in FIG. 7, the transmission control system 1*b*, unlike the transmission control system 1 according to the first embodiment, does not comprise a rotational state detection device 2. Additional, the speed detection device 6 outputs information regarding the riding speed to the transmission controller 4. Since the other configurations of the transmission control system 1*b* according to the third embodiment are the same configurations as the transmission control system 1 according to the first embodiment, they will not be described in detail.

When a determination is made that the riding speed that is detected by the speed detection device 6 is less than or equal to a first prescribed value, the drive controller 3 operates the motor 120 to drive the chain 117. Specifically, the drive controller 3 controls the motor driver 120*a* and makes the motor 120 drive the chain 117. Regarding the other features of the drive controller 3, since they are the same as the drive controller 3 according to the first embodiment, they will not be described again in detail. Meanwhile, the above-described first prescribed value is, for example, 3 km/h.

When a determination is made that the riding speed that is detected by the speed detection device 6 is less than or equal to the first prescribed value, the transmission controller 4 controls the rear derailleur 118*r* to shift gears. Regarding the other features of the transmission controller 4, since they are the same as the transmission controller 4 according to the first embodiment, they will not be described again in detail.

Figure 8:
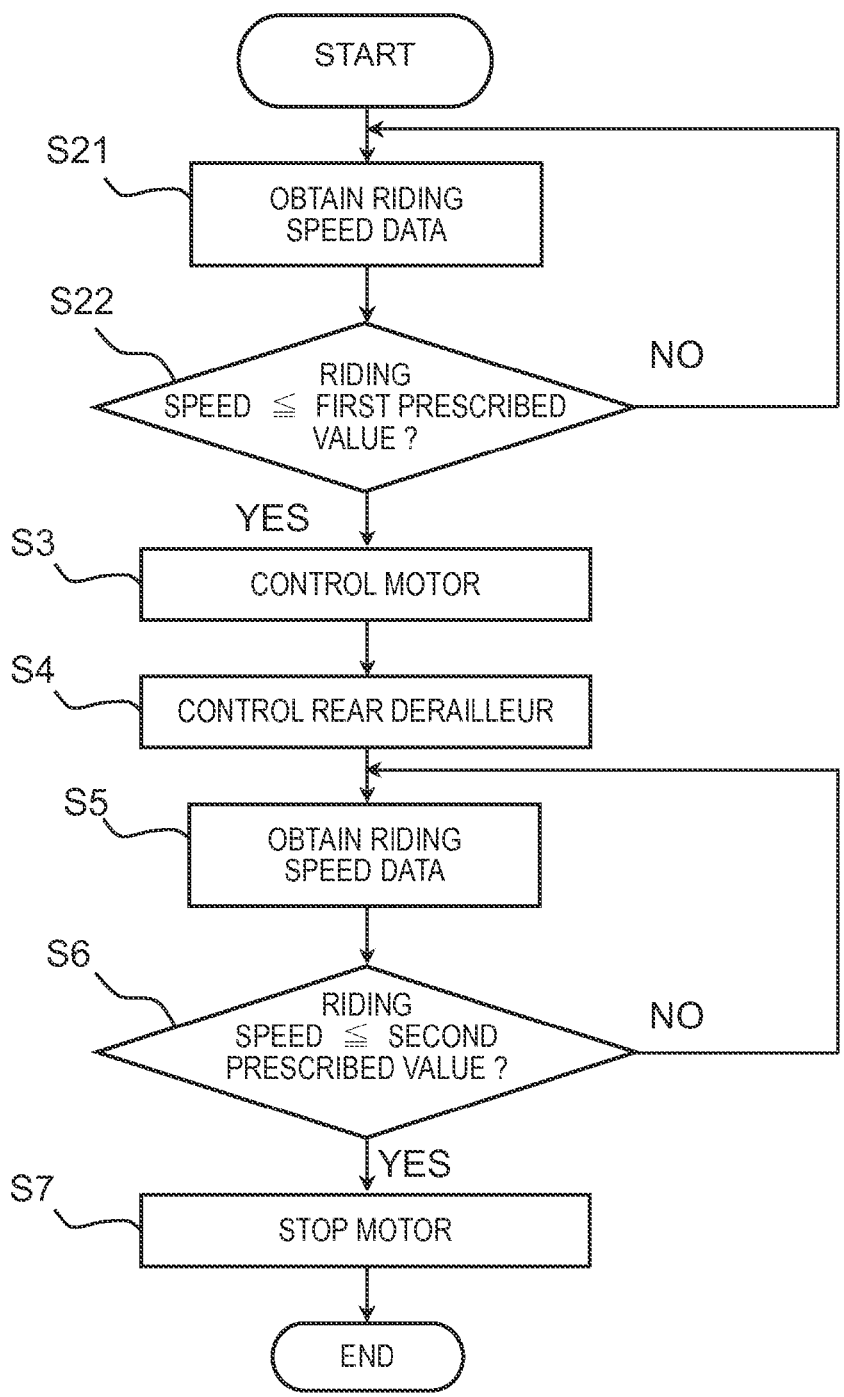
FIG. 8 is a flow chart showing a process executed by the transmission control system in accordance with the third embodiment.

Next, the process of the transmission control system 1*b* according to the third embodiment will be explained with reference to FIG. 8. FIG. 8 is a flow chart that shows the process executed by the transmission control system 1*b* according to the third embodiment. Since the processes of steps S3-S7 in FIG. 8 are the same as in the first embodiment, they will not be explained again in detail.

As shown in FIG. 8, the drive controller 3 and the transmission controller 4 obtain information regarding the riding speed that is detected by the speed detection device 6 (step S21).

Next, the drive controller 3 and the transmission controller 4, based on information regarding the obtained riding speed, determine whether or not the riding speed of the bicycle 101 is less than or equal to the first prescribed value (step S22).

If at least the drive controller 3 or the transmission controller 4 determines that the riding speed is not less than or equal to the first prescribed value (No in step S22), the process moves on to step S21 mentioned above. If the drive controller 3 and the transmission controller 4 determine that the riding speed is less than or equal to the first prescribed value (Yes in step S22), the drive controller 3 operates the motor 120 to drive the chain 117 (step S3). Additionally, the transmission controller 4 controls the rear derailleur 118r to shift gears (step S4).

Next, the drive controller 3 obtains information regarding the riding speed again (step S5). The drive controller 3, based on information regarding the obtained riding speed, determines whether or not the riding speed is less than or equal to the second prescribed value (reference value) that is preset beforehand (step S6). That is, the drive controller 3, like the above-described first embodiment, determines whether or not the riding speed is less than or equal to a reference value that is preset beforehand. This second prescribed value is a value that is less than the above-described first prescribed value.

When a determination is made that the riding speed is less than or equal to the second prescribed value (Yes in step S6), the drive controller 3 stops the motor 120 (step S7). When a determination is made that the riding speed is not less than or equal to the second prescribed value (No in step S6), the drive controller 3 moves on to the process of step S5 mentioned above.

While only selected embodiments have been chosen to illustrate the present invention, it will be apparent to those skilled in the art from this disclosure that various changes and modifications can be made herein without departing from the scope of the invention as defined in the appended claims.

Modified Example 1

In the above-described embodiments, the drive controller 3 controls the motor 120, and the transmission controller 4 controls the rear derailleur 118r. However, the invention is not particularly limited to this configuration. For example, the drive controller 3 and the transmission controller 4 can be configured as a single integrated controller. That is, a single integrated controller can control both the motor 120 and the rear derailleur 118r at the same time.

Modified Example 2

In the above-described embodiment, the transmission controller 4 controls the rear derailleur 118r. However, the invention is not particularly limited to this configuration. That is, the transmission controller 4 can control only the front derailleur 118f or both the front derailleur 118f and the rear derailleur 118r in step S4 of the above mentioned control process.

Modified Example 3

In the above-described embodiment, upon driving the chain 117 to shift gears, the chain 117 is driven by a motor 120 for assisting. However, the invention is not particularly limited to this configuration. For example, the transmission control system can comprise a driving force output device that is different from the motor 120 and that can shift gears by driving the chain 117 with the driving force of that driving force output device. This driving force output device can drive the chain 117 without using the front sprocket 115 as an intermediary.

Modified Example 4

In the above-described embodiment, the drive controller 3 controls the motor 120 so that the driving force that the motor 120 outputs will not exceed a reference value that corresponds to the riding speed that is detected by the speed detection device 6. However, the invention is not particularly limited to this configuration. For example, the drive controller 3 can control the motor 120 so that the rotational speed of the motor 120 will not exceed a reference value that corresponds to the riding speed that is detected by the speed detection device 6. This "reference value that corresponds to the riding speed" refers to the rotational speed of the motor 120 that is necessary to achieve this riding speed. If the output axle of the motor 120 rotates at a rotational speed that exceeds this reference value, the rear wheel 105 is rotary driven via the chain 117, rear sprocket group 116, etc. For this reason, with the drive controller 3 controlling the motor 120 so that the rotational speed of the motor 120 does not exceed the above-described reference value, the motor 120 drives only the chain 117 and will not rotary drive the rear wheel 105. This reference value can change depending on the gear ratio, etc., and the drive controller 3 stores information regarding the reference value that is correlated with the gear ratio and the riding speed.

Thus, the foregoing descriptions of the embodiments according to the present invention are provided for illustration only, and not for the purpose of limiting the invention as defined by the appended claims and their equivalents.

What is claimed is:

1. A transmission control system for used in a bicycle having a crank, a front sprocket that is rotatable independent of the crank, a rear wheel, a rear sprocket that is rotatable independent of the rear wheel, a chain that engages with the front sprocket and the rear sprocket, and at least one external transmission mechanism, the transmission control system comprising:
    a driving force output device configured to drive the chain;
    a cadence sensor configured to detect a rotational state of the crank; and
    at least one controller programmed to control the driving force output device to drive the chain and to control a gear shifting action of the at least one external transmission mechanism to shift gears, based on the rotational state of the crank that is detected by the cadence sensor upon determining that the cadence of the crank is less than or equal to a prescribed value, the prescribed value being greater than zero.

2. The transmission control system according to claim 1, further comprising
    a one-way clutch operatively disposed between the driving force output device and the front sprocket.

3. The transmission control system according to claim 1, further comprising
    a resultant force member configured to transmit a manual drive force that is input to the crank and a driving force that is output from the driving force output device to the front sprocket.

4. The transmission control system according to claim 1, further comprising
    a gear position detection device configured to detect a gear position of at least the external transmission mechanism, the at least one controller being programmed to control the gear shifting action of the at least one external transmission mechanism to a prescribed gear position.

5. The transmission control system according to claim 4, wherein
the at least one controller is programmed to control the gear shifting action of the at least one external transmission mechanism to a prescribed gear shifting ratio, based on gear shifting ratio information that shows a correspondence between the gear position and a gear shifting ratio.

6. A transmission control system for used in a bicycle having a crank, a front sprocket that is rotatable independent of the crank, a rear wheel, a rear sprocket that is rotatable independent of the rear wheel, a chain that engages with the front sprocket and the rear sprocket, and at least one external transmission mechanism, the transmission control system comprising:
a driving force output device configured to drive the chain;
a rotational state detection device configured to detect a rotational state of the crank; and
at least one controller programmed to control the driving force output device to drive the chain and to control a gear shifting action of the at least one external transmission mechanism to shift gears, based on the rotational state of the crank that is detected by the rotational state detection device, upon determining that the rotational state of the crank is in a prescribed state,
the at least one controller being further programmed to stop a driving action of the chain by the driving force output device upon determining the gear shifting action of the at least one external transmission mechanism to shifting gears is completed.

7. A transmission control system for used in a bicycle having a crank, a front sprocket that is rotatable independent of the crank, a rear wheel, a rear sprocket that is rotatable independent of the rear wheel, a chain that engages with the front sprocket and the rear sprocket, and at least one external transmission mechanism, the transmission control system comprising:
a driving force output device configured to drive the chain;
a rotational state detection device configured to detect a rotational state of the crank;
at least one controller programmed to control the driving force output device to drive the chain and to control a gear shifting action of the at least one external transmission mechanism to shift gears, based on the rotational state of the crank that is detected by the rotational state detection device, upon determining that the rotational state of the crank is in a prescribed state; and
a speed detection device configured to detect a riding speed of the bicycle, the at least one controller being programmed to control a driving force outputted by the driving force output device so that the driving force will not exceed a reference value that corresponds to the riding speed that is detected by the speed detection device.

8. The transmission control system according to claim 7, wherein
the driving force output device comprises an electric motor.

9. The transmission control system according to claim 8, wherein
the at least one controller is programmed to control the driving force output device so that a rotational speed of the electric motor will not exceed a reference value that corresponds to the riding speed that is detected by the speed detection device.

10. The transmission control system according to claim 7, wherein
the at least one controller stops a driving action of the chain by the driving force output device upon determining the riding speed that is detected by the speed detection device becomes less than or equal to a reference value.

11. A transmission control system for used in a bicycle having a crank, a front sprocket that is rotatable independent of the crank, a rear wheel, a rear sprocket that is rotatable independent of the rear wheel, a chain that engages with the front sprocket and the rear sprocket, and at least one external transmission mechanism, the transmission control system comprising:
a driving force output device configured to drive the chain;
a manual drive force detecting device configured to detect a manual drive force is inputted to the crank; and
at least one controller programmed to control the driving force output device to drive the chain and a gear shifting action of the at least one external transmission mechanism to shift gears, based on the manual drive force that is detected by the manual drive force detecting device, upon determining that the manual drive force is less than or equal to a prescribed value.

12. A transmission control system for used in a bicycle having a crank, a front sprocket that is rotatable independent of the crank, a rear wheel, a rear sprocket that is rotatable independent of the rear wheel, a chain that engages with the front sprocket and die rear sprocket, and at least one external transmission mechanism, the transmission control system comprising:
a driving force output device configured to drive the chain;
a speed detection device configured to detect a riding speed of the bicycle; and
at least one controller programmed to control the driving force output device to drive the chain and to control a gear shifting action of the at least one external transmission mechanism to shift gears, based on the riding speed that is detected by the speed detection device, upon determining that the riding speed is less than or equal to a first prescribed value.

13. The transmission control system according to claim 12, wherein
the at least one controller is programmed to stop a driving action of the chain by the driving force output device upon determining the riding speed that is detected by the speed detection device becomes less than or equal to a second prescribed value that is smaller than the first prescribed value.

* * * * *